United States Patent [19]

Coggan

[11] Patent Number: 5,703,315

[45] Date of Patent: Dec. 30, 1997

[54] DEVICE AND METHOD FOR TRANSVERSELY CUTTING A BAND

[75] Inventor: David A. Coggan, Arlington, Tex.

[73] Assignee: Loral Vought Systems Corporation, Grand Prairie, Tex.

[21] Appl. No.: 637,481

[22] Filed: Apr. 25, 1996

[51] Int. Cl.[6] ........................................ B64D 1/00
[52] U.S. Cl. ............................ 89/1.14; 114/221 A
[58] Field of Search ............ 89/1.1, 1.14; 102/377–378; 30/180, 272.1, 278, 282; 83/580; 114/221 A

[56] References Cited

U.S. PATENT DOCUMENTS

| | | | |
|---|---|---|---|
| 2,924,147 | 2/1960 | Bohl et al. | 89/1.14 |
| 3,482,484 | 12/1969 | Brizzolara | 89/1.1 |
| 3,661,084 | 5/1972 | Noles | 89/1.14 |
| 3,780,689 | 12/1973 | Giebel et al. | 89/1.14 X |
| 3,885,484 | 5/1975 | Sturgis | 83/580 |
| 3,895,552 | 7/1975 | Lagofun | 83/580 |
| 3,991,649 | 11/1976 | Patrichi | 89/1.14 |
| 4,062,112 | 12/1977 | Lake | 30/228 |
| 4,493,240 | 1/1985 | Norton | 89/1.14 |
| 4,719,858 | 1/1988 | Stiles | 102/378 |
| 4,730,653 | 3/1988 | Pantone et al. | 144/195.5 |
| 5,177,317 | 1/1993 | Walker et al. | 89/1.14 |
| 5,361,676 | 11/1994 | Gibbs | 89/1.14 |

FOREIGN PATENT DOCUMENTS 940436 10/1963 United Kingdom.

OTHER PUBLICATIONS

Special Devices, Incorporated Brochure, Cable Cutter #16082, Jan. 4, 1994.

Primary Examiner—Michael J. Carone
Assistant Examiner—Matthew J. Lattig
Attorney, Agent, or Firm—Sidley & Austin

[57] ABSTRACT

A band cutter transversely cuts a band having a longitudinal axis and major and minor transverse dimensions perpendicular to the band's longitudinal axis, the major dimension of the band being greater than the minor dimension of the band. The band cutter has a housing having a barrel chamber and a support channel formed therein, the barrel chamber and the support channel having longitudinal axes which are generally parallel and coaxial to each other. A band slot, extending through the housing and transversely intersecting the support channel, is adapted to receive the band and prevent significant lateral and rotational movement of the band during cutting. A blade is positioned within the support channel and is sized to move along the support channel. Upon initiation of a pyrotechnic charge positioned at one end of the barrel chamber, the blade impacts a minor transverse dimension edge and cuts across the major transverse dimension of the band, thereby severing the band, while the support channel laterally supports the blade. A method is also disclosed for cutting the band. A blade is transversely positioned with respect to a portion of the band and the thus positioned blade is moved toward the band so that the blade impacts a minor transverse dimension side of the band and cuts across the major transverse dimension of the band thereby severing the band. Significant lateral and rotational movement of the band is prevented during cutting, and the blade is laterally supported during cutting.

23 Claims, 2 Drawing Sheets

DEVICE AND METHOD FOR TRANSVERSELY CUTTING A BAND

TECHNICAL FIELD OF THE INVENTION

This invention relates to a cutting device for transversely cutting a band by a laterally supported cutting blade, the band being restricted in its motion during cutting, and to a method for transversely cutting a band while providing lateral support for the cutting blade and while restricting the motion of the band during cutting.

BACKGROUND OF THE INVENTION

Various pyrotechnically actuated cutting devices have been proposed for cutting lines, wires and bolts. A basic cutting device, such as that described by U.S. Pat. Nos. 2,924,147 and 5,361,676, comprises a cylindrical barrel having diametrically opposed holes near a first end of the barrel for passage of a fastener (e.g. a bolt, wire, or line) transversely through the barrel. At the second end of the barrel is a pyrotechnic charge, and a cutting element is located between the pyrotechnic charge and the first end of the barrel. Upon initiation of the pyrotechnic charge, the cutting element is propelled forwardly along the barrel and through the fastener, thereby severing the fastener.

Variations of this basic cutter include a wire cutter which provided components for securing a blade at a fixed position within the barrel prior to initiation of the pyrotechnic charge. As another variation, the blade may have a recessed conical cavity at its cutting end such that a segment is cut from the wire and recessed within the conical cavity. A wire cutter may also have a slot that opens onto the outside of the barrel so that the slot can be placed over a wire instead of a wire being fed into the barrel through diametrically opposing holes. A line cutter may also have a pyrotechnic charge that includes a delay charge and a flexible sear wire for controlling the initiation of the pyrotechnic charge.

One application requiring a remotely operated cutting device involves the transportation and deployment of unmanned, air vehicles, e.g., a missile. For efficient storage and transportation, these vehicles are stored with their wings laid against the body of the vehicle. In order to maintain the wings in this position, they can be fastened in position against the body of the vehicle. Using fasteners such as bolts or screws would require forming holes in the wings of the vehicle for which the fastener would pass therethrough. The local stresses on the wings and vehicle body would be relatively high due to the reduced application area of the fastener. If a fastener such as a cable or wire is used to fasten the wings by continuously encircling the circumference of the vehicle, the local stress would be reduced over that of a single point fastener but would be still relatively large due to the minimal contact area between a restraint with a circular cross-section and the locally planar surface of the vehicle wings and body. A circular cross-section restraint is also undesirable because of possible rolling or slippage of the restraint in the direction parallel to the longitudinal axis of the vehicle having its wings restrained. If a flat band which continuously encircles the vehicle is used, then the stress associated with restraining the wings is distributed over the entire surface area of the flat band, thereby minimizing local compressive stress on the wings. A flat band is therefore preferable for restraining the wings of the vehicle because the flat band provides minimal disruption of the aerodynamic surface of the vehicle, reduces longitudinal slippage of the restraint and local compressive stress on the wings, and allows for minimal storage volume. Flat bands can be used as temporary fasteners in numerous other applications, for example air-dropped items (e.g. military hardware, supplies, or humanitarian aid), underwater restraints (e.g. tanks or other supplies), or dormant safety devices (e.g. containment doors).

Upon deployment of the unmanned, air vehicle, the restraining band must be cut so that the wings of the vehicle are freed and allowed to deploy to their operational position. While some of the previously described cutting devices are suitable for remote cuttings, these cutting devices present problems with respect to cutting a flat restraining band. The previously described cutting devices are designed to cut fasteners such as bolts, lines and wires having substantially circular cross-sections perpendicular to the longitudinal axis of the fastener. The diametrically opposing circular holes in the cutters through which such fasteners are passed reflect this shape and are therefore also generally circular. Because a flat band has a substantially rectangular cross-section having a very small thickness in comparison to its substantial width, the diametrically opposing holes of these band cutters are not suitable for receiving the shape of a flat band. While the holes in the above described cutters may be large enough for a band to be passed therethrough, the circular edges of the holes would not provide adequate support for the band so that the band would be sufficiently restricted during cutting against the force of the blade. If the band is not restricted, then the band may only be pushed by the blade or distorted in shape. Even if the band is severed, the cutting may be inefficient and unreliable since the orientation of the band during cutting is unpredictable. Thus, these cutters are inappropriate for cutting a band because they do not have holes appropriately shaped for sufficiently restricting the motion of a flat band during cutting.

In addition, because the previously described cutters are designed to cut fasteners having substantially circular cross-sections, these cutters are not suitable for cutting a fastener in the shape of a flat band which has a small thickness in comparison to a substantial width. When using a flat restraining band, the width of the band should be parallel to the surface to which the band is applied in order to reduce compressive stress on the surface. Additionally, in order to minimize the protrusion of the cutter from the surface of the item being restrained, the blade of the cutter should be positioned axially adjacent a thickness side of the band rather than adjacent the width side of the band. Thus, the blade of a cutter having this orientation with respect to the band must traverse the entire width of the band in order to sever the band, but the height of the blade need only be slightly larger than the small thickness of the band. The thickness of the blade must be minimized in order to provide the maximum mount of cutting pressure by minimizing the incident contact area between the blade and the portion of the band impacted by the blade. Not only do the previously described cutters fail to provide sufficient restriction and support of a flat band during cutting, they also do not incorporate the use of a thin cross-sectioned blade or a means of maintaining the above described relationship between the band and the cutting blade so that the band may be severed transversely.

SUMMARY OF THE INVENTION

Thus it is an object of the present invention to provide a cutting device for transversely cutting a flat band. It is a further object of the present invention to provide a cutting device which provides for the rapid and reliable transverse cutting of a band. Another object of the present invention is to provide a cutting device having a predetermined orientation between the blade and band and increased blade stability whereby the blade can cut through a substantial width without breaking, bending, jamming, or becoming off-track from the cutting path. It is a further object of the present invention to provide a cutting device that restricts the motion of a band against the force of the blade as the band is being cut. It is a further object of the present invention to provide a band cutter that does not substantially protrude from the object to which it is attached, thereby reducing packaging volume and possible drag or disruption of the aerodynamics of the object to which the cutter is attached. Another object of the present invention is to provide a method for cutting a band while providing lateral support for the cutting blade and while restricting the motion of the band during cutting.

The invention is a band cutter for transversely cutting a band with a laterally supported blade, while restricting the lateral and rotational motion of the band during cutting, and a method for transversely cutting a band while restricting the lateral and rotational motion of the band during cutting and providing lateral support for the cutting blade. The band cutter for cutting a band having major and minor transverse dimensions, with the major transverse dimension of the band being greater than the minor transverse dimension of the band, is comprised of a housing having a barrel chamber and a support channel formed therein. The longitudinal axes of the barrel chamber and the support channel are generally parallel and coaxial to each other. The housing further has a band slot that transversely intersects the support channel and is formed so as to receive the band to be cut and to restrict motion of the band to be cut by preventing significant lateral and rotational movement of the band during cutting. A cutting blade is positioned within the support channel, the dimensions of the cutting blade being such that the cutting blade can move easily along the support channel while lateral movement of the cutting blade is prevented. The movement of the cutting blade can be caused by a high pressure gas generated from the initiation of a pyrotechnic charge positioned within the barrel chamber. The movement of the cutting blade through the support channel will cause the cutting blade to impact the band positioned within the band slot and to cut along the major transverse dimension of the band. The cutting blade thereby severs the band which is restricted in its motion during cutting while the support channel laterally supports the cutting blade. The method for cutting a band is comprised of positioning a cutting blade with respect to a band. The cutting blade has major and minor transverse dimensions which are perpendicular to each other and both of which are perpendicular to the longitudinal axis of the blade. The band has major and minor transverse dimensions that are perpendicular to each other and both of which are perpendicular to the longitudinal axis of the band. The cutting blade is positioned such that the major transverse dimension of the cutting blade is parallel to the minor transverse dimension of the band and perpendicular to the longitudinal axis of the band. The band is restricted so that the orientation of the major and minor transverse dimensions of the blade with respect to the band remains during cutting of the band. Then, while providing lateral support to the cutting blade, the thus positioned cutting blade is moved toward the band so that the cutting blade impacts a minor transverse dimension edge of the band and cuts across the major transverse dimension of the band, thereby severing the band.

DETAILED DESCRIPTION

Figure 1:
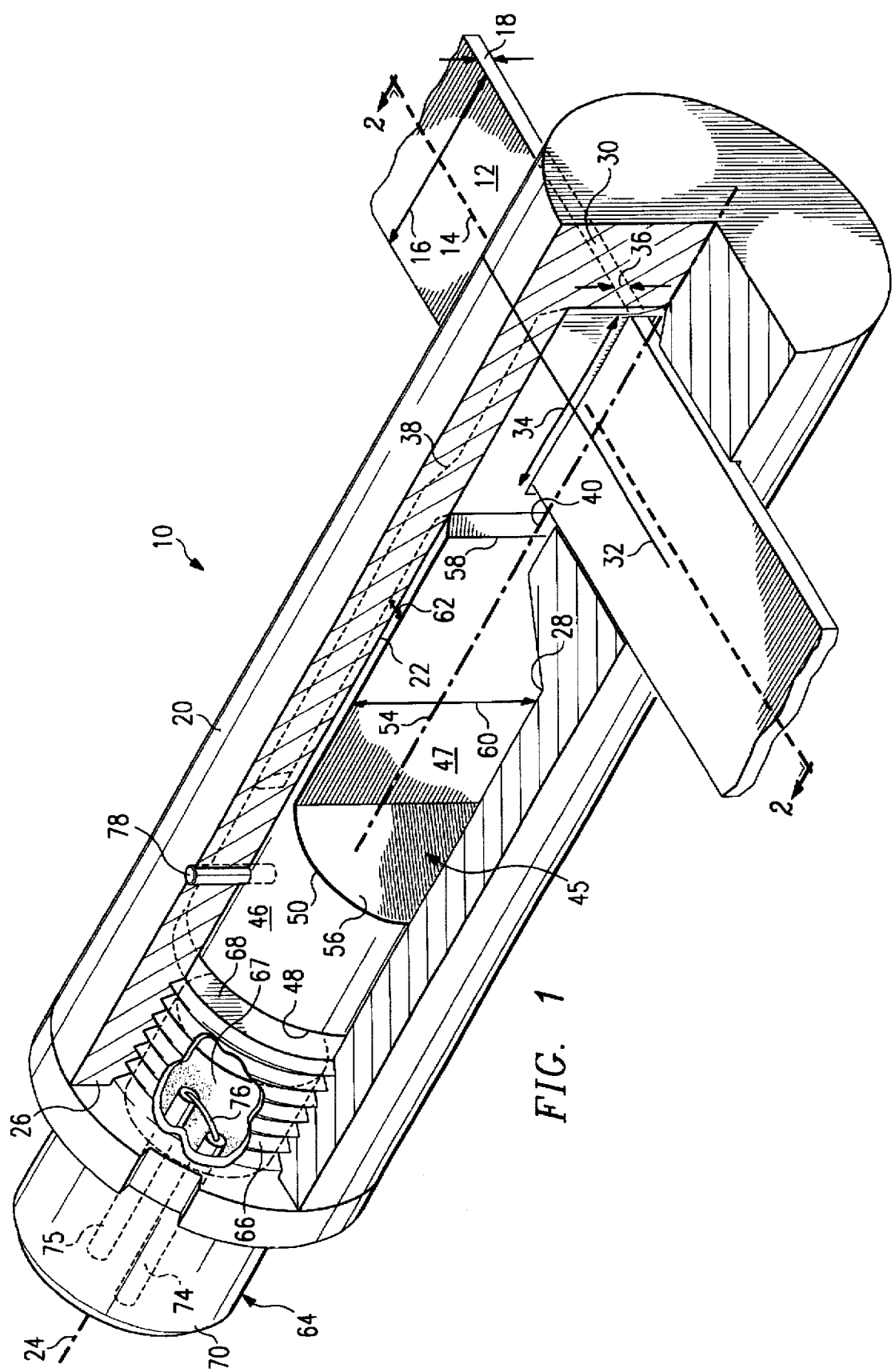
FIG. 1 is a perspective view of a band cutter according to the present invention.

FIG. 1 shows a perspective view of a band cutter 10 for cutting a band 12 having a longitudinal axis 14, a major transverse dimension (width) 16, and a minor transverse dimension (thickness) 18. The major and minor transverse dimensions 16, 18 of the band 12 are in a plane perpendicular to the longitudinal axis 14 of the band 12, and the major transverse dimension 16 is greater than, and preferably substantially greater than, the minor transverse dimension 18 of the band 12.

The band cutter 10 is comprised of a housing 20 having an elongated barrel chamber 22 formed therein, with the barrel chamber 22 having a longitudinal axis 24. The barrel chamber 22 extends along its longitudinal axis 24 from one end 26 of the barrel chamber 22 to an opposite end 28 of the barrel chamber 22. The housing 20 further has a band slot 30 formed therein, the band slot 30 having a longitudinal axis 32, a major transverse dimension (width) 34, and a minor transverse dimension (thickness or height) 36. Preferably, the major transverse dimension 34 of the band slot 30 is generally parallel to the longitudinal axis 24 of the barrel chamber 22. The minor transverse dimension 36 of the band slot 30 is perpendicular to both the major transverse dimension 34 and the longitudinal axis 32 of the band slot 30. The major transverse dimension 34 of the band slot 30 is greater than, and preferably substantially greater than, the minor transverse dimension 36 of the band slot 30. Thus, the band slot 30 is adapted to receive the band 12 such that the major transverse dimension 16 of the band 12 is parallel to the major transverse dimension 34 of the band slot 30, and the minor transverse 18 dimension of the band 12 is parallel to the minor transverse dimension 36 of the band slot 30. Preferably, the size of the band slot 30 is such that the surfaces of the portion of the band 12 contained within the band slot 30 will be in fictional contact with the wall surfaces of the band slot 30. The walls of the band slot 30 thereby restrict the motion of the band 12 within the band cutter 10 and forces the band 12 to remain positioned during cutting such that translation of the band 12 in the direction of the major transverse dimension 16 of the band 12, translation of the band 12 in the direction of the minor transverse dimension 18 of the band 12, rotation of the band 12 about its longitudinal axis 14, rotation of the band 12 about an axis parallel to the major transverse dimension 16 of the band 12, and rotation of the band 12 about an axis parallel to the minor transverse dimension 18 of the band 12 are minimal. Thus, significant lateral and rotational movement of the band 12 within the band slot 30 is prevented. The housing 20 further has a support channel 38 formed therein, with the support channel 38 having a longitudinal axis 40 which is generally parallel to, and preferably coaxial with, the longitudinal axis 24 of the barrel chamber 22. The support channel 38 has a major transverse dimension 42 (shown in FIG. 2) and a minor transverse dimension 44 (shown in FIG. 2). The support channel 38 opens onto the end 28 of the barrel chamber 22 and intersects and extends through the band slot 30.

A cutting element 45, comprised of a piston 46 and a cutting blade 47, is positioned within the barrel chamber 22 for movement along the longitudinal axis 24 of the barrel chamber 22. The piston 46 has a first axial end 48 that faces the end 26 of the barrel chamber 22, and a second axial end 50 that faces the end 28 of the barrel chamber 22. The cutting blade 47, having a longitudinal axis 54 and first and second ends 56 and 58, is connected at its first end 56 to the second axial end 50 of the piston 46 such that the longitudinal axis 54 of the cutting blade 47 is generally parallel to, and preferably coaxial with, the longitudinal axis 24 of the barrel chamber 22 and the longitudinal axis 40 of the support channel 38. The cutting blade 47 has a major transverse dimension 60 that is generally greater than, and preferably substantially greater than, a minor transverse dimension 62 of the cutting blade 47. The major transverse dimension 60 of the cutting blade 47 is parallel to the major transverse dimension 42 of the support channel 38, and the minor transverse dimension 62 of the cutting blade 47 is parallel to the minor transverse dimension 44 of the support channel 38. Thus, the minor transverse dimension 62 of the cutting blade 47 is also parallel to the longitudinal axis 32 of the band slot 30. The cutting blade 47 should be at least as long as the major transverse dimension 16 of the band 12 so that the cutting blade 47 will be able to cut the entire length of the major transverse dimension 16 of the band 12. The major and minor transverse dimensions 60 and 62 of the cutting blade 47 are sized to allow the cutting blade 47 to be moved along the support channel 38 by the piston 46 while the support channel 38 provides lateral support for the cutting blade 47, and preferably the piston 46 and the major and minor transverse dimensions 60 and 62 of the cutting blade 47 are sized such that the piston 46 and the cutting blade 47 are in fictional contact with the walls of the barrel chamber 22 and support channel 38 respectively. Preferably, the cutting blade 47 is initially positioned so that a portion of the cutting blade 47 is within the support channel 38. In addition, the end 50 of the piston 46 is preferably shaped so as to blend into the end 56 of the cutting blade 47. This blended transition in geometry between the piston 46 and the cutting blade 47 minimizes stress concentrations that may otherwise damage the cutting element 45 under the high stress conditions that exist during the cutting event. In addition, the end 28 of the barrel chamber 22 has a complementary and inverted shape to that of the blended transitional geometry between the piston 46 and cutting blade 47 so that end 28 of the barrel chamber 22 acts as a positive stop to the forward movement of the cutting element 45.

Figure 2:
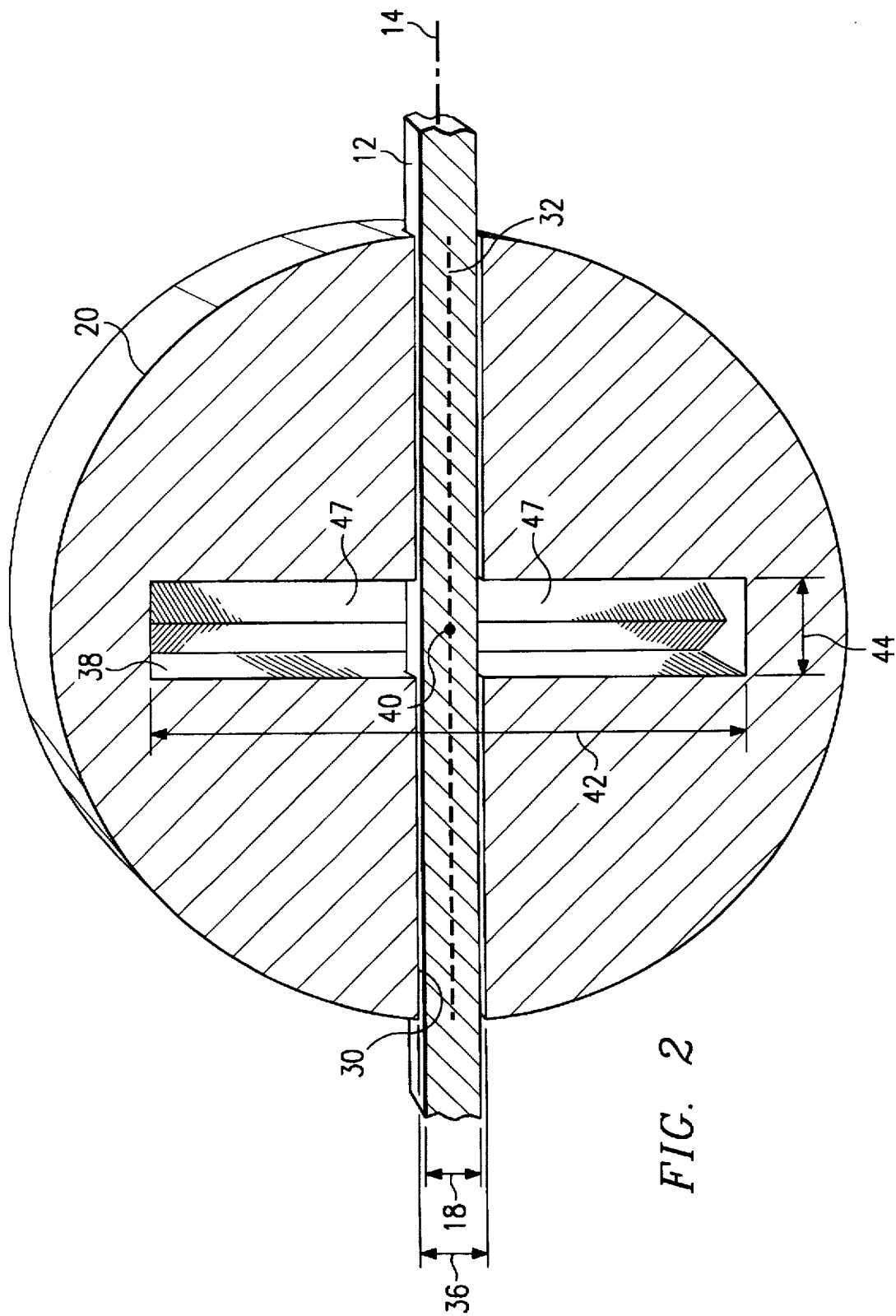
FIG. 2 is a cross-sectional view of the band cutter in FIG. 1 showing the orientation of the band with respect to the blade within the band cutter.

The orientation of the band 12, the band slot 30, and the support channel 38 are best seen in FIG. 2, which is a cross-sectional view through the housing 20 of the band cutter 10. The band 12, having its longitudinal axis 14 and its minor transverse dimension 18, is shown passing through the band slot 30. The band slot 30 has a longitudinal axis 32 and a minor transverse dimension 36. The band 12 is positioned in the band slot 30 such that the longitudinal axis 14 of the band 12 is parallel to and, preferably coaxial with the longitudinal axis 32 of the band slot 30. The support channel 38 has a major transverse dimension 42 and a minor transverse dimension 44, both dimensions 42 and 44 being perpendicular to each other and to the longitudinal axis 40 of the support channel 38. The major transverse dimension 42 is greater than, and preferably substantially greater than, the minor transverse dimension 44. Preferably, the longitudinal axis 40 of the support channel 38 intersects the longitudinal axis 32 of the band slot 30 at a right angle, and the major transverse dimension 42 of the support channel 38 is perpendicular to the longitudinal axis 32 of the band slot 30. The cutting blade 47 is shown in the support channel 38 and positioned to contact a minor transverse dimension edge of the band 12.

Referring again to FIG. 1, a cartridge 64 is threadably attached to an end of the housing 20 opposite the band slot 30. The cartridge 64 is comprised of a charge cup 66, which contains therein a pyrotechnic charge 67 such as a propellant and/or explosive, which, upon initiation will cause a pyrotechnic event, i.e. detonation or deflagration. The cartridge 64 is further comprised of an end cap 68 that seals the pyrotechnic charge 67 within the charge cup 66. The cartridge 64 is applied to the housing 20 in such a fashion as to prevent the ejection of the cartridge 64 from the end 26 of the barrel chamber 22 during the pyrotechnic event and to prohibit leakage of the generated high pressure gas between the cartridge 64 and the housing 20 which could reduce the efficiency of the pyrotechnic charge 67.

The cartridge 64 further has an electrical header 70 which contains therein two electrical connectors 74 and 75, such as two wires or two pins. The electrical connectors 74 and 75 extend into the pyrotechnic charge 67 contained in the charge cup (56, and are connected by a bridge wire A shear pin 78 passing through the housing 20 and into the cutting element 45 prevents the cutting blade 47 from impacting the band 12 prior to initiation of the pyrotechnic charge 67. The shear pin 78 is sized to predictably fail when the pyrotechnic event causes the motion of the cutting element 45.

Initiation of the pyrotechnic charge 67 contained within the charge cup 66 of the cartridge 64 causes a pyrotechnic event, which fails the end cap 68 and generates a high pressured gas behind the cutting element 45. The high pressure gas propels the cutting element 45 forward such that the piston 46 drives the cutting blade 47 along the support channel 38. The propulsive force generated by the high pressure gas acting on the cutting element 45 is sufficient to fail the shear pin 78 and allow the cutting blade 47 to impact the band 12, which is passed through the band slot 30 and thus intersects the path of the cutting blade 47 through the support channel 38. The band slot 30 restricts lateral and rotational motion of the band 12 during cutting so that the minor transverse dimension 18 of the band 12 remains parallel to the major transverse dimension 60 of the cutting blade 47. The support channel 38 provides lateral support for the cutting blade 47 during the forward motion of the cutting blade 47 through the band 12 until the cutting blade 47 has traveled a substantial portion and preferably the entirety of the extent of the major transverse dimension 16 of the band 12, thus severing the band 12.

For applications of the above-described band cutter to the deployment of unmanned, air vehicles, the band cutter is used to sever a band that restrains the wings of the vehicle in a folded configuration against the sides of the vehicle fuselage. To achieve this configuration, the band is first fed through the band slot of the band cutter. The band is then passed around the circumference of the vehicle in order to encircle the vehicle with the wings laid against the sides of the vehicle. The band is then tensioned until the band is sufficiently tight to restrain the wings against the forces that act to deploy the wings of the vehicle. The ends of the band are then clamped together. The band cutter is attached to the vehicle by virtue of the band which encircles the vehicle. The band used to restrain the wings and/or fins to the sides of the vehicle is preferably made of stainless steel and has a width (major transverse dimension) of 0.5 inches and a thickness (minor transverse dimension) of 0.025 inches. To prevent corrosion, the band can be coated in zinc. The size and material of the band is primarily determined by the requirements of the application in which the band is used. For example, given a vehicle whose wings are deployed via aerodynamic forces generated when exposed to airflow over its external surface, the band used to restrain the wings must be sized and the appropriate material chosen to counter these deployment forces during the period from the vehicle's first exposure to the airstream until the conditions for wing deployment are met. In contrast, given a vehicle whose wings are deployed using pre-compressed springs, the band material and size may be selected so that the band can counter the stored spring energy.

Preferably, the housing of the band cutter is made of stainless steel and is cylindrically shaped and positioned on the vehicle with the longitudinal axis of the housing generally parallel to the longitudinal axis of the vehicle so that the protrusion of the cutter is minimized. The housing is preferably approximately two inches long and has a diameter of approximately 0.5 inches. The overall shape of the band cutter will depend on the shape of the vehicle to which it is attached. In the illustrated embodiment of FIG. 1, the housing 20 has a cylindrical exterior shape, but any suitable shape for minimizing the aerodynamic and surface disruption of the object to which the band cutter is applied can be used. For example, when the band cutter will be applied to a curved surface, the housing can be shaped in a conformal fashion so that the bottom surface of the cutter will fit to the curved surface while the outwardly facing surfaces can be faired into the surface of the object to which the cutter is applied. In addition, while in the illustrated embodiment, the housing 20 is a single component having a closed end opposite the end containing the pyrotechnic charge, the housing could instead have an open end which is sealed by an anvil end cap that threads into the housing.

The size of the band slot will be determined by the size of the band needed to restrain the wings. The band slot and band should be in frictional contact such that the band can be easily inserted through the band slot, but also such that the translation of the band in the direction of the band major transverse direction, translation of the band in the direction of the band minor transverse direction, rotation of the band about its longitudinal axis, rotation of the band about an axis parallel to the major dimension of the band and rotation of the band about an axis parallel to the minor dimension of the band are minimal. Thus, the band slot preferably has major and minor transverse dimensions only slightly larger than 0.5 inches and 0.025 inches, respectively.

Given a preferred band width of 0.5 inches, the blade should be at least 0.5 inches long and is made from 17-4 or similar grade tool steel. The piston which drives the blade is also made of 17-4 or similar grade tool steel and is formed such that the cutting blade and piston comprise a single cutting element. While other suitably sized blades can be used, the blade, and also the support channel, must be at least as long as the width (major transverse dimension) of the band to be cut. The height of the blade and the major transverse dimension of the support channel must also be at least the thickness (minor transverse dimension) of the band slot. The preferable shape of the blade tip is a double bevel shape, like the cutting blade 47 shown in FIG. 1. The blade could have any other suitable tip geometry, for example, an angled tip that is slanted from bottom to top. For further blade stability, the blade can have glides, such as shearwebs which would give the blade an "T" shaped cross-section and could be used within a modified support channel shaped to accommodate the guides of the blade, as long as the guides do not interfere with the portion of the blade necessary to cut the band. The blade and support channel, and piston and barrel chamber, should be sized such that the piston and blade are movable along the barrel chamber and support channel respectively, but are also in frictional contact with the surfaces of the barrel chamber and support channel, thereby providing maximum lateral support for the blade and maximum propulsion from the high pressure gas behind the piston upon initiation of the pyrotechnic charge. The piston can incorporate o-rings at the interface with the barrel chamber to reduce gas leakage around the piston and increase efficiency of the cutting element motion.

The cartridge of the band cutter is preferably a standard initiator such as an NSI 3/8-24 power cartridge, which threadably attaches to one end of the housing opposite the band slot. However, any suitable configuration using a pyrotechnic charge and a mechanism for initiating the pyrotechnic charge can be used. Upon initiation of the illustrated cartridge, the cartridge produces a high pressure gas that propels the cutting element forward, thereby driving the blade through the band. To generate a high pressure gas, the cartridge may contain a propellant and/or an explosive, the mount and type of which depends on the required output force on the cutting element. In the preferred embodiment, the pyrotechnic charge will be wired to an electrical power source on board the vehicle to which the band cutter is attached. On board electronics will control the time of initiation of the pyrotechnic charge based on how, when and where the vehicle will be deployed. The pyrotechnic charge could be initiated in other manners, such as a pull sear or pyrotechnic chain of events. While in the preferred embodiment the movement of the cutting element is caused by initiation of a pyrotechnic charge, any energy source capable of imparting sufficient force to the cutting element (piston) to accelerate the blade through the band can be employed, for example compressed gas or hydraulic pressure.

While in the illustrated embodiment each of the band 12, the band slot 30, the cutting blade 47, and the support channel 38 has a rectangular cross section perpendicular to its longitudinal axis, other suitable cross-sections can be employed so long as each cross-section has major and minor transverse dimensions perpendicular to its longitudinal axis, the major transverse dimension is greater than the minor transverse dimension. While in the illustrated embodiment each of the piston 46 and the barrel chamber 22 has a circular cross-section perpendicular to its longitudinal axis, other suitable cross-sectional configurations can be employed. In addition, a band cutter could contain more than one band slot for cutting more than one band. In such a configuration, the band slots could be stacked so that the major transverse dimensions of each of the band slots would be substantially parallel to each other. The band cutter could also have more than one blade attached to the piston, each blade being supported by its own support channel. With such a cutting element, a section of the band could be severed and removed from the band, as opposed to the band being severed by a single cut. Furthermore, in the illustrated embodiment, the support channel preferably intersects the band slot such that the major traverse dimension of the support channel is perpendicular to the longitudinal axis of the band slot and parallel to the minor transverse dimension of the band slot. However, the support channel can be positioned with respect to the band slot such that the major transverse dimension of the support channel intersects the longitudinal axis of the band slot at any suitable angle while the longitudinal axis of the support channel remains parallel to the major transverse dimension of the band slot. Because in such a configuration the minor transverse dimension of the band projects a larger area on the major transverse dimension of the cutting blade, the cutting blade must have a height (major transverse dimension) greater than the projected minor transverse dimension of the band. The support channel can also be positioned with respect to the band slot such that the minor transverse dimension of the support channel intersects the major transverse dimension of the band slot at any suitable angle while the major transverse dimension of the support channel remains parallel to the minor transverse dimension of the band slot. In such a configuration the band is angled with respect to the support channel so that the cutting blade must cut across a greater distance in order to travel from one edge of the band to another and thereby sever the band. In addition, the band slot could be suitably tilted such that the major transverse dimension of the band slot is no longer parallel to the longitudinal axis of the support channel, while the longitudinal axis of the band slot remains perpendicular to the longitudinal axis of the support channel. Because in such a configuration the major transverse dimension of the band projects a larger area on the major transverse dimension of the cutting blade, the cutting blade must have a height (major transverse dimension) greater than the projected major transverse dimension of the band. Reasonable other variations and modifications are possible within the scope of the foregoing description, the drawings, and the appended claims to the invention.

What is claimed is:

1. A band cutter for cutting a band having a longitudinal axis and major and minor transverse dimensions, each of said transverse dimensions being perpendicular to said longitudinal axis, the major transverse dimension being greater than the minor transverse dimension, the band cutter comprising:

a housing;

said housing having a barrel chamber formed therein, said barrel chamber having a longitudinal axis along which said barrel chamber extends from a first end of said barrel chamber to a second end of said barrel chamber;

said housing having a band slot formed therein, said band slot having a longitudinal axis along which said band slot extends through said housing from a first end of said band slot to a second end of said band slot, said band slot having a major transverse dimension and a minor transverse dimension with each of the major and minor transverse dimensions of said band slot being perpendicular to each other and to the longitudinal axis of said band slot, with the major transverse dimension of said band slot being greater than the minor transverse dimension of said band slot, said band slot being adapted to receive therein a portion of the band to be cut so that the major transverse dimension of the band is parallel to the major transverse dimension of said band slot and the minor transverse dimension of the band is parallel to the minor transverse dimension of said band slot, said portion of the band to be cut extending through said band slot from said first end of said band slot to said second end of said band slot, said band slot having walls which restrict lateral and rotational movement of said portion of the band to be cut during cutting of the band;

a cutting blade positioned within said barrel chamber, said cutting blade having major and minor transverse dimensions, the major transverse dimension of said cutting blade being greater than the minor transverse dimension of said cutting blade, the minor transverse dimension of said cutting blade being generally parallel to the longitudinal axis of said band slot, and the major transverse dimension of said cutting blade being generally perpendicular to the longitudinal axis of said band slot and generally parallel to the minor transverse dimension of said band slot;

an energy source positioned within said barrel chamber, said energy source being adapted for effecting movement of said cutting blade along the longitudinal axis of said barrel chamber toward said band slot;

whereby, upon movement of the cutting blade through said barrel chamber, said cutting blade impacts said portion of the band positioned within said band slot such that the cutting blade cuts through said band to thereby sever said band while said walls of the band slot restrict substantially any lateral and rotational movement of said portion of the band.

2. A band cutter in accordance with claim 1, wherein said housing further has a support channel formed therein, said support channel having a longitudinal axis along which said support channel extends from a first end of said support channel to a second end of said support channel, the longitudinal axis of said support channel being parallel to the longitudinal axis of said barrel chamber and transversely intersecting the longitudinal axis of said band slot, said second end of said barrel chamber being open to said first end of said support channel, said support channel be sized so as to permit movement of said cutting blade along the longitudinal axis of said support channel while limiting lateral motion of said cutting blade within said support channel, whereby upon movement of said cutting blade through said support channel, said cutting blade impacts the band positioned within said band slot such that said cutting blade cuts through said band while said cutting blade is laterally supported by said support channel.

3. A band cutter in accordance with claim 2, wherein said support channel has major and minor transverse dimensions, each of the major and minor transverse dimensions of said support channel being perpendicular to the longitudinal axis of said support channel, the major transverse dimension of said support channel being greater than the minor transverse dimension of said support channel, the major transverse dimension of said support channel being generally perpendicular to the longitudinal axis of said band slot and generally parallel to the minor transverse of said band slot.

4. A band cutter in accordance with claim 1 further comprising a piston contained within said barrel chamber and positioned between said energy source and said cutting blade, whereby said energy source can cause said piston to move said cutting blade so as to sever a band positioned within said band slot.

5. A band cutter in accordance with claim 4, wherein said piston and said cutting blade comprise a single cutting element.

6. A band cutter in accordance with claim 1, wherein said energy source comprises a pyrotechnic charge positioned at said first end of said barrel chamber, whereby the initiation of said pyrotechnic charge causes the release of a gas having sufficient pressure to cause said cutting blade to move through said support channel so as to sever a band positioned within said band slot.

7. An apparatus comprising:

a band cutter in accordance with claim 6, wherein said energy source further comprises an electrical initiator for initiating said pyrotechnic charge; and a band having a longitudinal axis and major and minor transverse dimensions, each of said transverse dimensions of the band being perpendicular to said longitudinal axis of the band, the major transverse dimension of the band being greater than the minor transverse dimension of the band, a portion of the band being positioned in the band slot of the band cutter such that the major transverse dimension of the band is parallel to the major transverse dimension of the band slot and the minor transverse dimension of the band is parallel to the minor transverse dimension of the band slot.

8. A band cutter for cutting a band having a longitudinal axis and major and minor transverse dimensions, each of said transverse dimensions being perpendicular to said longitudinal axis, the major transverse dimension being greater than the minor transverse dimension, the band cutter comprising:

a housing;

said housing having a barrel chamber formed therein, said barrel chamber having a longitudinal axis along which said barrel chamber extends from a first end of said barrel chamber to a second end of said barrel chamber;

said housing having a support channel formed therein, said support channel having a longitudinal axis along which said support channel extends from a first end of said support channel to a second end of said support channel, said support channel having a major transverse dimension and a minor transverse dimension, each of the major and minor transverse dimensions of said support channel being perpendicular to the longitudinal axis of said support channel, the longitudinal axis of said support channel being parallel to the longitudinal axis of said barrel chamber, said second end of said barrel chamber being open to said first end of said support channel;

said housing having a band slot formed therein, said band slot having a longitudinal axis along which said band slot extends through said housing from a first end of said band slot to a second end of said band slot, said band slot having a major transverse dimension and a minor transverse dimension with each of the major and minor transverse dimensions of said band slot being perpendicular to each other and to the longitudinal axis of said band slot, with the major transverse dimension of said band slot being greater than the minor transverse dimension of said band slot, said band slot being adapted to receive therein a portion of the band to be cut so that the major transverse dimension of the band is parallel to the major transverse dimension of said band slot and the minor transverse dimension of the band is parallel to the minor transverse dimension of said band slot, said portion of the band to be cut extending through said band slot from said first end of said band slot to said second end of said band slot, said band slot having walls which restrict lateral and rotational movement of said portion of the band during cutting of the band;

a cutting blade positioned within said support channel, said cutting blade having major and minor transverse dimensions, the major transverse dimension of said cutting blade being greater than the minor transverse dimension of said cutting blade, the major transverse dimension of said cutting blade being generally perpendicular to the longitudinal axis of said band slot and generally parallel to the minor transverse dimension of said band slot, the minor transverse dimension of said cutting blade being generally parallel to the longitudinal axis of said band slot, said support channel limiting lateral motion of said cutting blade as said cutting blade moves along the longitudinal axis of said support channel; and an energy source positioned within said barrel chamber, said energy source being adapted for effecting movement of said cutting blade along the longitudinal axis of said support channel toward said band slot;

whereby, upon movement of said cutting blade through said support channel, said cutting blade impacts said portion of the band positioned within said band slot, thereby severing the band while said walls of the band slot restrict substantially any lateral and rotational movement of said portion of the band and while said support channel provides lateral support for said cutting blade.

9. A band cutter in accordance with claim 8, wherein said cutting blade has major and minor transverse dimensions each being generally perpendicular to the longitudinal axis of said support channel, with the major transverse dimension of said cutting blade being generally perpendicular to the longitudinal axis of said band slot and generally parallel to the minor transverse dimension of said band slot.

10. A band cutter in accordance with claim 8 further comprising a piston contained within said barrel chamber and positioned between said energy source and said cutting blade, whereby said energy source can cause said piston to move said cutting blade through said support channel so as to sever a band positioned within said band slot.

11. A band cutter in accordance with claim 10, wherein said piston and said cutting blade comprise a single cutting element.

12. A band cutter in accordance with claim 8, wherein said energy source comprises a pyrotechnic charge positioned at said first end of said barrel chamber, whereby the initiation of said pyrotechnic charge causes the release of a gas having sufficient pressure to cause said cutting blade to move through said support channel so as to sever a band positioned within said band slot.

13. A band cutter in accordance with claim 12, wherein said energy source further comprises an electrical initiator for initiating said pyrotechnic charge.

14. A band cutter for cutting a band having a longitudinal axis and major and minor transverse dimensions, each of said transverse dimensions being perpendicular to the longitudinal axis of the band, the major transverse dimension being substantially greater than the minor transverse dimension, the band cutter comprising:

a housing;

said housing having a barrel chamber formed therein, said barrel chamber having a longitudinal axis along which said barrel chamber extends from a first end of said barrel chamber to a second end of said barrel chamber;

said housing having a band slot formed therein, said band slot having a longitudinal axis along which said band slot extends through said housing from a first end of said band slot to a second end of said band slot, said band slot having a major transverse dimension and a minor transverse dimension with each of the major and minor transverse dimensions of said band slot being perpendicular to each other and to the longitudinal axis of said band slot, with the major transverse dimension of the band slot being generally parallel to the longitudinal axis of said barrel chamber, the major transverse dimension of said band slot being greater than the minor transverse dimension of said band slot, said band slot being adapted to receive therein a portion of the band to be cut, with the major transverse dimension of the band being parallel to the major transverse dimension of said band slot and the minor transverse dimension of the band being parallel to the minor transverse dimension of said band slot, said portion of the band to be cut extending through said band slot from said first end of said band slot to said second end of said band slot, said band slot having walls which restrict lateral and rotational movement of said portion of the band to be cut during cutting of the band;

said housing having a support channel formed therein, said support channel having a longitudinal axis along which said support channel extends from a first end of said support channel to a second end of said support channel, the longitudinal axis of said support channel being parallel to the longitudinal axis of said barrel chamber, said support channel having a major transverse dimension and a minor transverse dimension with each of the major and minor transverse dimensions of said support channel being perpendicular to each other and to the longitudinal axis of said support channel, the major transverse dimension of said support channel being greater than the minor transverse dimension of said support channel, said first end of said support channel being open to said second end of said barrel chamber and extending through said band slot, the major transverse dimension of said support channel being perpendicular to the longitudinal axis of said band slot and parallel to the minor transverse dimension of said band slot;

a piston positioned within said barrel chamber for movement along the longitudinal axis of said barrel chamber, said piston having a first axial end facing said first end of said barrel chamber and a second axial end facing said second end of said barrel chamber;

a cutting blade having a longitudinal axis extending from between a first end of said cutting blade and a second end of said cutting blade, said first end of said cutting blade being connected to said second axial end of said piston such that the longitudinal axis of said cutting blade is parallel to the longitudinal axis of said barrel chamber and to the longitudinal axis of said support channel, said cutting blade having a major transverse dimension and a minor transverse dimension, the major transverse dimension of said cutting blade being greater than the minor transverse dimension of said cutting blade, with the major transverse dimension of said cutting blade being parallel to and slightly smaller than the major transverse dimension of said support channel and the minor transverse dimension of said cutting blade being parallel to and slightly smaller than the minor transverse dimension of said support channel so that said cutting blade can be moved along said support channel by said piston, the minor transverse dimension of said cutting blade being parallel to the longitudinal axis of said band slot, and the major transverse dimension of said cutting blade being perpendicular to the longitudinal axis of said band slot and parallel to the minor transverse dimension of said band slot;

a pyrotechnic charge located within said barrel chamber between said first axial end of said piston and said first end of said barrel chamber; and a device for initiating said pyrotechnic charge to thereby cause the release of a gas having sufficient pressure to cause said piston to move said cutting blade through said support channel so that said second end of said cutting blade engages a longitudinally extending edge of a portion of a band positioned within said band slot and severs the thus positioned band along the major transverse dimension of the thus positioned band while said walls of said band slot restrict substantially any lateral and rotational movement of said portion of the thus positioned band and while said support channel provides lateral support for said cutting blade.

15. A band cutter in accordance with claim 14, wherein said device for initiating said pyrotechnic charge is an electrical initiator.

16. A band cutter in accordance with claim 14, wherein said piston and said cutting blade comprise a single cutting element.

17. A method of transversely cutting a band with a blade, wherein the band has a longitudinal axis, two major transverse surfaces, and two minor transverse surfaces, each of the major and minor transverse surfaces of said band being perpendicular to the longitudinal axis of said band, the major transverse surfaces of said band being greater than the minor transverse surfaces of said band, and said blade has a longitudinal axis and major and minor transverse dimensions, each of the major and minor transverse dimensions of said blade being perpendicular to the longitudinal axis of said blade, the major transverse dimension of said blade being greater than the minor transverse dimension of said blade, the method comprising the steps of:

positioning said blade with respect to a portion of said band such that the major transverse dimension of said blade is generally perpendicular to the longitudinal axis of said band and generally parallel to a minor transverse surface of said band;

moving the thus positioned blade in a direction generally parallel to the major transverse surfaces of said band such that said blade impacts a minor transverse surface of the band and cuts across the major transverse surfaces of said band, thereby severing said band; and providing frictional contact along a portion of the major transverse surfaces of said band, thereby restricting lateral and rotational movement of said band during cutting.

18. A method in accordance with claim 17, said method further comprising the step of laterally supporting said blade so that lateral movement of said blade during cutting is restricted.

19. A method in accordance with claim 17, said method further comprising the step of initiating a pyrotechnic charge so as to cause said step of moving the thus positioned blade.

20. A method in accordance with claim 17, said method further comprising the step of electrically initiating a pyrotechnic charge so as to cause said step of moving the thus positioned blade.

21. A method of transversely cutting a band with a blade, wherein the band has a longitudinal axis, two major transverse surfaces, and two minor transverse surfaces, each of the major and minor transverse surfaces of said band being perpendicular to the longitudinal axis of said band, the major transverse surfaces of said band being greater than the minor transverse surfaces of said band, and said blade has a longitudinal axis and major and minor transverse dimensions, each of the major and minor transverse dimensions of said blade being perpendicular, to the longitudinal axis of said blade, the major transverse dimension of said blade being greater than the minor transverse dimension of said blade, the method comprising the steps of:

positioning said blade with respect to a portion of said band such that the major transverse dimension of said blade is perpendicular to the longitudinal axis of said band and parallel to a minor transverse surface of said band;

moving the thus positioned blade in a direction parallel to the major transverse surfaces of said band such that said blade impacts a minor transverse surface of the band and cuts across the major transverse surfaces of said band, thereby severing said band;

providing frictional contact along a portion of the major transverse surfaces of said band, thereby restricting lateral and rotational movement of said band during cutting; and laterally supporting said blade so that lateral movement of said blade during cutting is restricted.

22. A method in accordance with claim 21, said method further comprising the step of initiating a pyrotechnic charge so as to cause said step of moving the thus positioned blade.

23. A method in accordance with claim 21, said method further comprising the step of electrically initiating a pyrotechnic charge so as to cause said step of moving the thus positioned blade.

* * * * *